(12) United States Patent
Nakano et al.

(10) Patent No.: US 11,254,800 B2
(45) Date of Patent: Feb. 22, 2022

(54) COATING OF INNER PLATE PART OF VEHICLE

(71) Applicant: MAZDA MOTOR CORPORATION, Hiroshima (JP)

(72) Inventors: Sakura Nakano, Hiroshima (JP); Masaaki Akamine, Hiroshima (JP); Kenta Okada, Hiroshima (JP); Hiroshi Kubota, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 281 days.

(21) Appl. No.: 16/706,885

(22) Filed: Dec. 9, 2019

(65) Prior Publication Data

US 2020/0109255 A1 Apr. 9, 2020

Related U.S. Application Data

(63) Continuation of application No. 15/867,340, filed on Jan. 10, 2018, now abandoned, which is a
(Continued)

(30) Foreign Application Priority Data

Mar. 28, 2013 (JP) .............................. JP2013-069949

(51) Int. Cl.
  *C08K 5/01* (2006.01)
  *C09D 201/00* (2006.01)
  (Continued)

(52) U.S. Cl.
  CPC ................ *C08K 5/01* (2013.01); *B60R 13/00* (2013.01); *C08K 3/22* (2013.01); *C09D 5/4415* (2013.01);
  (Continued)

(58) Field of Classification Search
  None
  See application file for complete search history.

(56) References Cited

U.S. PATENT DOCUMENTS 5,246,492 A 9/1993 Arima et al.
5,990,219 A 11/1999 Sakai et al.
(Continued)

FOREIGN PATENT DOCUMENTS

CN 101085877 A 12/2007
JP S59-183867 A 10/1984
(Continued)

OTHER PUBLICATIONS

JP-2002275426-A, Sep. 2002, Machine translation (Year: 2002).*
(Continued)

*Primary Examiner* — Satya B Sastri
(74) *Attorney, Agent, or Firm* — Studebaker & Brackett PC

(57) ABSTRACT

A coating of an outer plate contains a perylene-based pigment, and satisfies $(R^{OH(P)}/R^{OH(OA)}) \geq 74$, where $R^{OH(P)}$ is the highlight reflectance of the coating of the outer plate at a peak wavelength at which reflectance reaches the maximum value in a spectral reflectance curve, and $R^{OH(OA)}$ is the average highlight reflectance of the coating of the outer plate in a complementary wavelength range. A coating of an inner plate part contains a perylene-based pigment and an iron oxide-based pigment, the content of the perylene-based pigment in the coating of the inner plate part is in units of PWC, and the mass ratio of the content of the iron oxide-based pigment to the content of the perylene-based pigment in the coating of the inner plate part is 3-20%.

7 Claims, 14 Drawing Sheets

Related U.S. Application Data continuation of application No. 14/402,657, filed as application No. PCT/JP2014/000641 on Feb. 6, 2014, now abandoned.

(51) Int. Cl.
    *C09D 5/44*     (2006.01)
    *C09D 7/40*     (2018.01)
    *B60R 13/00*     (2006.01)
    *C08K 3/22*     (2006.01)
    *C09D 7/41*     (2018.01)
    *C08K 5/00*     (2006.01)

(52) U.S. Cl.
    CPC ................. *C09D 7/40* (2018.01); *C09D 7/41* (2018.01); *C09D 201/00* (2013.01); *C08K 5/0041* (2013.01); *C08K 2003/2265* (2013.01); *Y10T 428/257* (2015.01)

(56) References Cited

U.S. PATENT DOCUMENTS

| | | | |
|---|---|---|---|
| 8,202,616 B2* | 6/2012 | Suzuki | B32B 5/024 428/411.1 |
| 2006/0199888 A1* | 9/2006 | Ono | C08K 3/22 524/431 |
| 2007/0128369 A1 | 6/2007 | Fujieda | |
| 2009/0159601 A1 | 6/2009 | Berrux et al. | |
| 2010/0237299 A1 | 9/2010 | Yamanaka et al. | |
| 2015/0217332 A1* | 8/2015 | Fujii | B05D 5/063 427/380 |

FOREIGN PATENT DOCUMENTS

| | | | |
|---|---|---|---|
| JP | S61-033268 A | | 2/1986 |
| JP | 2001-232283 A | | 8/2001 |
| JP | 2002-275426 A | | 9/2002 |
| JP | 2002275426 A | * | 9/2002 |
| JP | 2003-093966 A | | 4/2003 |
| JP | 2006-274243 A | | 10/2006 |
| JP | 2006-281415 A | | 10/2006 |
| JP | 2010-155912 A | | 7/2010 |
| JP | 2011-026543 A | | 2/2011 |
| JP | 2011026543 A | * | 2/2011 |
| RU | 2161634 C2 | | 1/2001 |
| WO | 2005/037448 A1 | | 4/2005 |

OTHER PUBLICATIONS

JP-2011026543-A, Feb. 2011, Machine translation (Year: 2011).*
International Search Report issued in PCT/JP2014/000641; dated Apr. 28, 2014.

* cited by examiner

LIGHT EXITING FROM MULTILAYER COATING

COATING OF INNER PLATE PART OF VEHICLE

CROSS-REFERENCE TO RELATED APPLICATIONS

This application is a Continuation Application of U.S. patent application Ser. No. 15/867,340 filed on Jan. 10, 2018, which is a Continuation Application of U.S. patent application Ser. No. 14/402,657 filed on Nov. 20, 2014, which is the U.S. National Phase Application of International Patent Application No. PCT/JP2014/000641 filed on Feb. 6, 2014, which claims the benefit of Japanese Patent Application No. 2013-069949 filed on Mar. 28, 2013, the entire contents of which are incorporated herein by reference.

TECHNICAL FIELD

The present invention relates to a coating of an inner plate part of a vehicle.

BACKGROUND ART

In recent years, a need exists for higher designability of vehicles. In particular, there is a demand for outer plates of vehicles to have coating colors having higher chroma (saturation) at the highlight and exhibiting greater appearance of depth. Thus, in the configuration in which an intermediate coating formed on an electrodeposited coating of an outer plate is further formed on a top coating, the top coating has, e.g., a trilaminar structure of a metallic base coating, a color-clear coating, and a transparent clear coating.

On the other hand, Patent Document 1 relates to a multilayer sheet which is for molding and which is useful for automobile-related components etc., and describes that the multilayer sheet has designability with great appearance of depth. That is, in the multilayer sheet in which a colored layer is stacked on a metallic glossy layer, the lightness L* of light transmitting through the colored layer is 20 to 80, a gloss value of the metallic glossy layer is equal to or greater than 200, and the chroma C* of light specularly reflected at 45 degrees is equal to or greater than 150.

CITATION LIST

Patent Document

PATENT DOCUMENT 1: Japanese Unexamined Patent Publication No. 2006-281415

SUMMARY OF THE INVENTION

Technical Problem

Coatings of inner plate parts of vehicles have colors similar to those of coatings of outer plates of the vehicles. For example, a top coating is formed only of a base coating in order to reduce VOC emission and cost. However, in this case, no clear coating is formed, and the base coating is exposed to the outside. Thus, there is a disadvantage that the coating is likely to be damaged. For example, an inner plate part of a pillar contacts a door-side (outer-plate-side) weather strip. Due to repetitive opening/closing of a door and vibration generated during traveling of a vehicle, it is likely that a coating surface of the pillar is abraded by the weather strip and that the surface worn by abrasion becomes noticeable. Particularly in the case where a perylene-based pigment having favorable coloring properties of red is used for the coating, the coating is likely to be worn out, and an abrasion mark(s) is likely to be noticeable.

The present invention relates to a coating of an inner plate part, and aims to ensure the coloring properties of the coating and to enhance the strength of the coating.

Solution to the Problem

According to the present invention, a perylene-based pigment and an iron oxide-based pigment are together used for a coating of an inner plate part in order to accomplish the foregoing.

In a coating producing a particular color, the reflectance measured with reference to the reflectance of a standard white plate at a light incidence angle of 45 degrees and a light reception angle of +30 degrees is defined as "highlight reflectance," a wavelength at which reflectance reaches the maximum value in a spectral reflectance curve is defined as a "peak wavelength" of the particular color, and a wavelength range including the hue of a complementary color of the particular color and the hues of colors positioned respectively on both sides of the complementary color of the particular color in a Munsell hue circle divided into ten hues is defined as a "complementary wavelength range."

In a vehicle of the present invention, a coating containing a perylene-based pigment is formed on an outer plate of the vehicle to produce the particular color. Moreover, the coating of the outer plate satisfies $(R^{OH(P)}/R^{OH(OA)}) \geq 74$, where $R^{OH(P)}$ is the highlight reflectance of the coating of the outer plate at the peak wavelength, and $R^{OH(OA)}$ is the average highlight reflectance of the coating of the outer plate in the complementary wavelength range.

A coating of an inner plate part of the vehicle contains a perylene-based pigment and an iron oxide-based pigment which are contained as pigments for producing a particular color similar to that of the coating of the outer plate. The content of the perylene-based pigment in the coating of the inner plate part is equal to or higher than 10% and equal to or lower than 14% in units of PWC, and the mass ratio of the content of the iron oxide-based pigment to the content of the perylene-based pigment in the coating of the inner plate part is equal to or higher than 3% and equal to or lower than 20%.

The coating of the outer plate satisfies $(R^{OH(P)}/R^{OH(OA)}) \geq 74$. It means that the highlight reflectance $R^{OH(P)}$ at the peak wavelength of the particular color is higher than the average highlight reflectance $R^{OH(OA)}$ in the complementary wavelength range, and particularly higher than 70 times the average highlight reflectance $R^{OH(OA)}$. Thus, high chroma at the highlight is achieved, and favorable appearance of denseness is exhibited.

Since the foregoing composition is employed for the coating of the inner plate part, high chroma at the highlight is achieved in the coating of the inner plate part as in the coating of the outer plate, and high strength of the coating of the inner plate part is also achieved. A coating is worn out due to scraping of resin forming a matrix of the coating. The resin is less likely to be scraped because the iron oxide-based pigment harder than the perylene-based pigment and exposed at a coating surface produces resistance. Thus, the progress of wear-out may be delayed.

The outer plate is a member forming an outer surface of the vehicle. Examples of the outer plate include a roof panel, a fender panel, and an openable member such as a front door, a rear door, and a bonnet. The inner plate part indicates, e.g., an inner part of the openable member, a side-frame outer part such as part of a pillar covered by the openable member, an inner surface of an engine room, or an inner surface of a luggage room.

Since the content of the perylene-based pigment in the coating of the inner plate part is equal to or higher than 10% and equal to or lower than 14% in units of PWC, favorable coloring properties are achieved, and high chroma at the highlight is achieved in the coating of the inner plate part as in the coating of the outer plate. Moreover, since an iron oxide-based pigment of equal to or higher than 3% is contained in terms of the mass ratio of the content of the iron oxide-based pigment to the content of the perylene-based pigment in the coating of the inner plate part, high strength of the coating is achieved. Further, since such a mass ratio is equal to or lower than 20%, the chroma, which is achieved by the perylene-based pigment, at the highlight is not significantly lowered.

In a preferable aspect, the coating of the inner plate part contains the pigments and a glittering material, and the ratio of the content of the perylene-based pigment to the total amount of the pigments and the glittering material in the coating of the inner plate part is equal to or higher than 50% by mass. This is advantageous to ensuring the chroma at the highlight.

In another preferable aspect, the mass ratio of the content of the iron oxide-based pigment to the content of the perylene-based pigment in the coating of the inner plate part is equal to or higher than 5% and equal to or lower than 15%. This is advantageous to ensuring the chroma at the highlight and increasing the coating strength.

In still another preferable aspect, the average particle size of the iron oxide-based pigment is equal to or greater than 50 nm and equal to or less than 60 nm. A smaller particle size of the iron oxide-based pigment results in better coloring properties, but results in lower dispersibility. When the average particle size of the iron oxide-based pigment is equal to or greater than 50 nm and equal to or less than 60 nm, favorable dispersibility is achieved without significantly lowering the coloring properties of the perylene-based pigment. This is advantageous to ensuring the coating strength.

In still another preferable aspect, the highlight reflectance ratio ($R^{IH(P)}/R^{OH(P)}$) of the inner plate part to the outer plate at the peak wavelength is equal to or higher than 0.5 and equal to or lower than 1.0, where $R^{IH(P)}$ is the highlight reflectance of the coating of the inner plate part at the peak wavelength. Thus, the chroma of the particular color at the highlight is at the substantially same level between the outer plate and the inner plate part, resulting in favorable appearance.

In still another preferable aspect, the average highlight reflectance ratio ($R^{IH(OA)}/R^{OH(OA)}$) of the inner plate part to the outer plate in the complementary wavelength range is equal to or higher than 1.0 and equal to or lower than 6.0, where $R^{IH(OA)}$ is the average highlight reflectance of the coating of the inner plate part in the complementary wavelength range. Thus, in the coating of the inner plate part, high chroma at the highlight is achieved, and favorable appearance of denseness is exhibited.

In still another preferable aspect, the face reflectance ratio ($R^{IF(P)}/R^{OF(P)}$) of the inner plate part to the outer plate at the peak wavelength is equal to or higher than 0.7 and equal to or lower than 1.3, where the reflectance measured with reference to the reflectance of the standard white plate at a light incidence angle of 45 degrees and a light reception angle of 0 degree is defined as "face reflectance," $R^{OF(P)}$ is the face reflectance of the coating of the outer plate at the peak wavelength, and $R^{IF(P)}$ is the face reflectance of the coating of the inner plate part at the peak wavelength. The shade reflectance ratio ($R^{IS(P)}/R^{OS(P)}$) of the inner plate part to the outer plate at the peak wavelength is equal to or higher than 1.0 and equal to or lower than 2.0, where the reflectance measured with reference to the reflectance of the standard white plate at a light incidence angle of 45 degrees and a light reception angle of −30 degrees is defined as "shade reflectance," $R^{OS(P)}$ is the shade reflectance of the coating of the outer plate at the peak wavelength, and $R^{IS(P)}$ is the shade reflectance of the coating of the inner plate part at the peak wavelength.

Thus, as the observation angle of the coating surface changes, the lightness and the chroma similarly change between the outer plate and the inner plate part, resulting in a less sense of discomfort.

In still another preferable aspect, the amount of worn-out coating every 100 reciprocations is less than 1.8 µm when a sheet of abrasive paper having a mesh count of #1000 and having an area of 20×20 mm is used to perform an abrasion test of the coating of the inner plate part under the conditions where a load is 200 g, a moving distance per reciprocation is 240 mm, the number of reciprocations per minute is 30, and the total number of reciprocations is 300.

Advantages of the Invention

According to the present invention, in the vehicle in which the coating of the outer plate contains the perylene-based pigment and satisfies ($R^{OH(P)}/R^{OH(OA)}$)≥74, where $R^{OH(P)}$ is the highlight reflectance of the coating of the outer plate at the peak wavelength of the particular color, and $R^{OH(OA)}$ is the average highlight reflectance of the coating of the outer plate in the complementary wavelength range, the coating of the inner plate part contains the perylene-based pigment and the iron oxide-based pigment, the content of the perylene-based pigment in the coating of the inner plate part is equal to or higher than 10% and equal to or lower than 14% in units of PWC, and the mass ratio of the content of the iron oxide-based pigment to the content of the perylene-based pigment in the coating of the inner plate part is equal to or higher than 3% and equal to or lower than 20%. Thus, high chroma at the highlight is achieved in the coating of the inner plate part as in the coating of the outer plate, and high strength of the coating of the inner plate part is achieved.

DESCRIPTION OF EMBODIMENTS

An embodiment of the present invention will be described below with reference to drawings. The embodiment described below will be set forth merely for the purpose of a preferred example in nature, and is not intended to limit the scope, applications, and use of the invention.

(Composition of Coating of Outer Plate of Vehicle)

Figure 1:
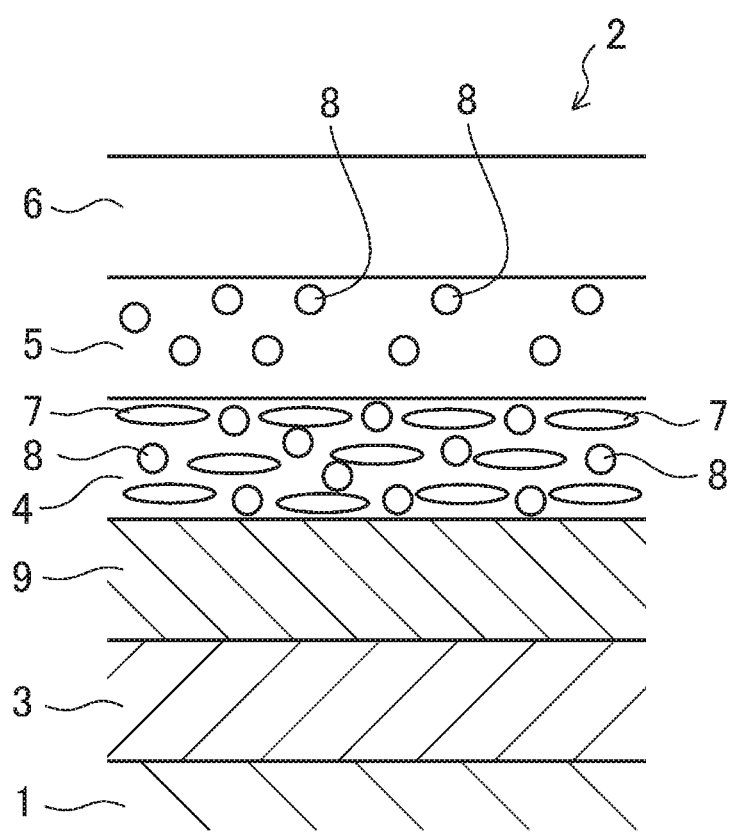
FIG. 1 is a cross-sectional view schematically illustrating the structure of a multilayer coating of an outer plate.

FIG. 1 schematically illustrates an example of a multilayer coating 2 formed on an outer surface of an outer plate (steel plate) 1. The multilayer coating 2 is formed such that a metallic base coating (1BC) 4, a color-clear coating (2BC) 5, a transparent top clear coating 6 are stacked on each other in this order. The metallic base coating 4 contains a glittering material 7 and a pigment 8, and the color-clear coating 5 contains a pigment 8. An electrodeposited coating 3 is formed on the surface of the outer plate 1 by cation electrodeposition coating, and an intermediate coating 9 is formed on the electrodeposited coating 3. Then, the multilayer coating 2 is, as a top coating, formed on the intermediate coating 9. The metallic base coating 4 and the color-clear coating 5 contains a perylene-based pigment as the red pigment 8, and the metallic base coating 4 contains aluminum flakes as the glittering material 7.

[Study on Coloring Mechanism]

The multilayer coating 2 is used to achieve higher chroma and higher lightness at the highlight, to exhibit the appearance of denseness, and to exhibit the appearance of depth. Thus, the coloring mechanism of a particular color (red) will be described.

Figure 2B:
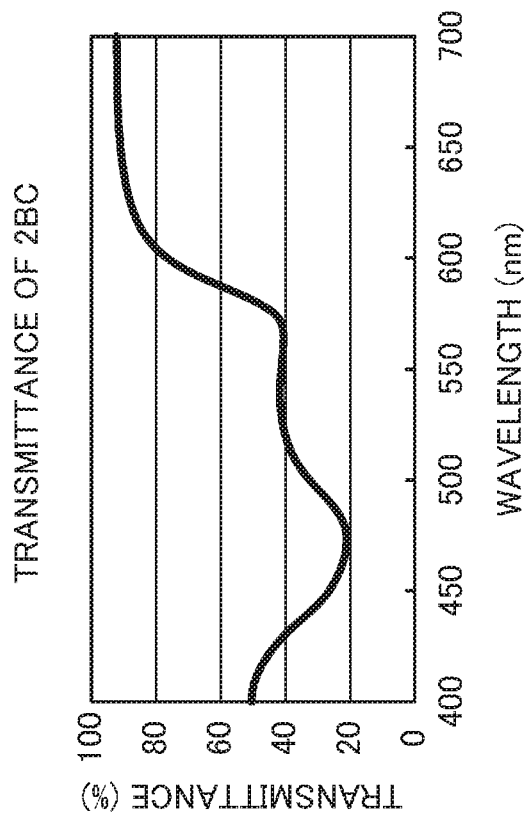
FIG. 2B is a graph illustrating an example of the spectral transmittance curve of the color-clear coating.
Figure 2A:
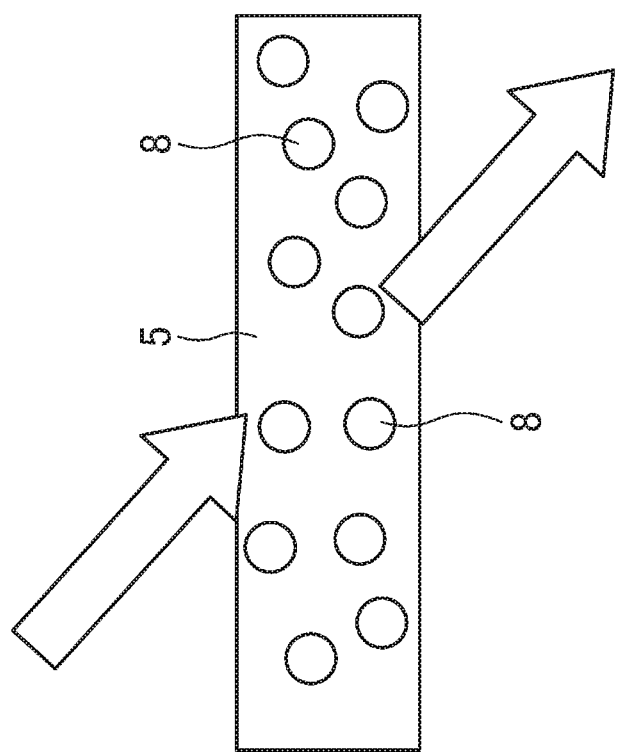
FIG. 2A is a cross-sectional view schematically illustrating the state in which external light enters and transmits through a color-clear coating.

Referring to FIG. 2A, light having transmitted through the top clear coating 6 enters the color-clear coating 5. FIG. 2B illustrates the spectral transmittance curve of the color-clear coating 5 containing the red pigment 8. In order to achieve higher chroma and higher lightness, the function to cause as much red light as possible to transmit through the color-clear coating 5 and the function to absorb as much light, which has colors other than red, as possible are provided to the color-clear coating 5.

Figure 3:
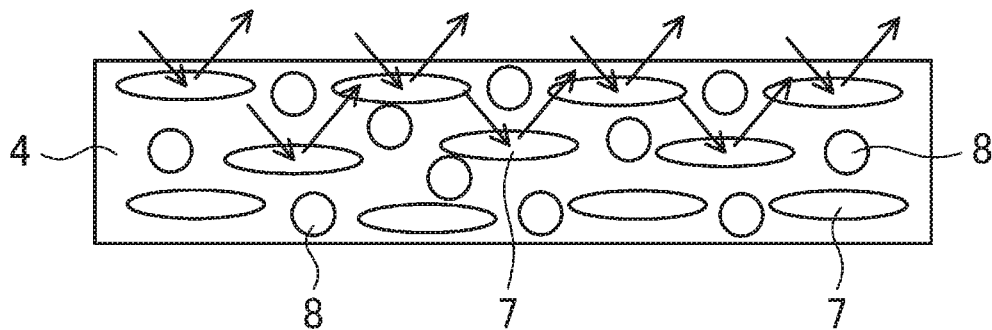
FIG. 3 is a cross-sectional view schematically illustrating light reflection at a glittering material of a metallic base coating.

Referring to FIG. 3, the light having transmitted through the color-clear coating 5 is reflected off the metallic base coating 4. In order to achieve higher chroma, the function to reflect as much incident light as possible is provided to the metallic base coating 4. Moreover, in order to exhibit greater appearance of depth, the function to increase flip-flop ("FF" meaning the degree of change in reflected light strength in association with a change in observation angle) is provided to the metallic base coating 4. Further, in order to achieve higher chroma, the function to reflect as much red light as possible and not to reflect as much light, which has colors other than red, as possible is provided to the metallic base coating 4.

Figure 4:
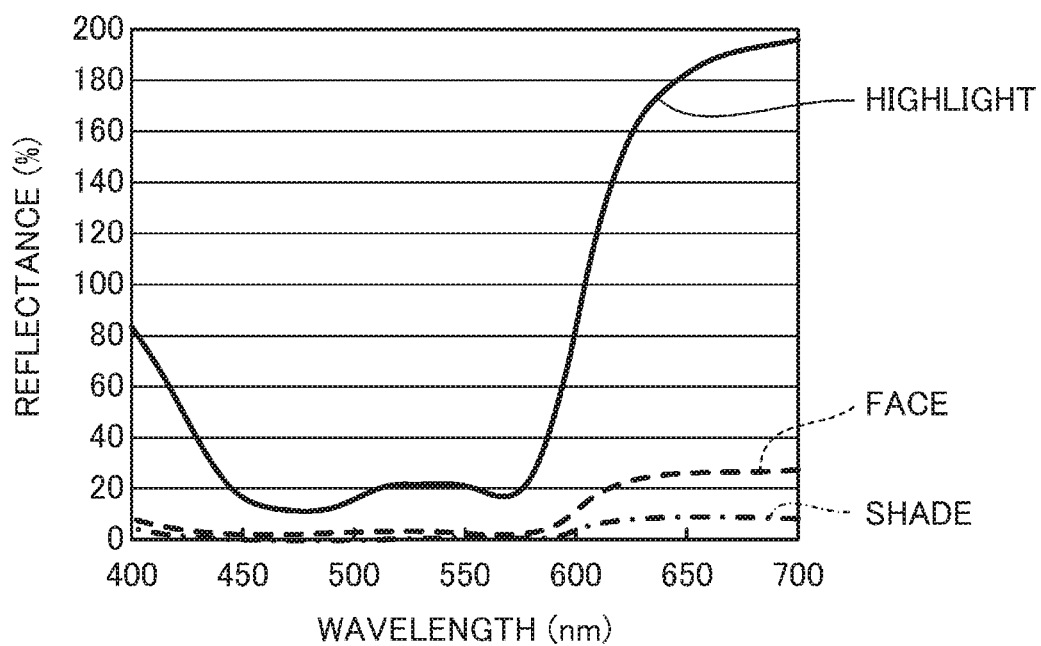
FIG. 4 is a graph illustrating an example of the spectral reflectance curves of the metallic base coating.

As in an example of the spectral reflectance curves of the metallic base coating 4 illustrated in FIG. 4, higher highlight reflectance of red light, lower shade reflectance of red light, and lower face reflectance of red light result in greater appearance of depth, and lower reflectance of light having colors other than red results in higher chroma. In the present specification, the reflectance measured with reference to the reflectance of a standard white plate at a light incidence angle of 45 degrees and a light reception angle of +30 degrees is defined as the "highlight reflectance," the reflectance measured with reference to the reflectance of the standard white plate at a light incidence angle of 45 degrees and a light reception angle of −30 degrees is defined as the "shade reflectance," and the reflectance measured with reference to the reflectance of the standard white plate at a light incidence angle of 45 degrees and a light reception angle of 0 degree is defined as the "face reflectance."

Figure 5:
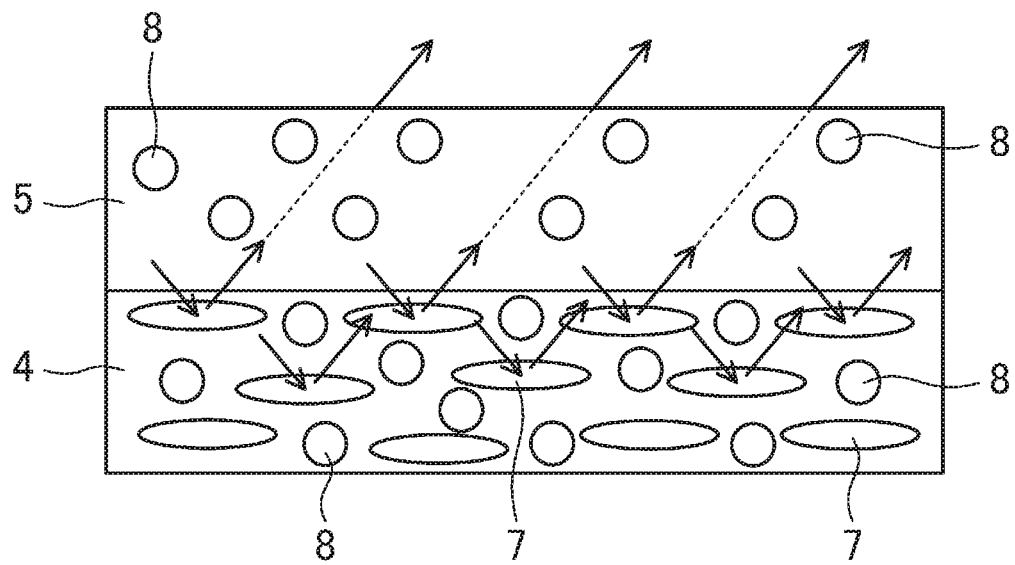
FIG. 5 is a cross-sectional view schematically illustrating the state in which light reflected off the metallic base coating transmits through the color-clear coating.
Figure 6:
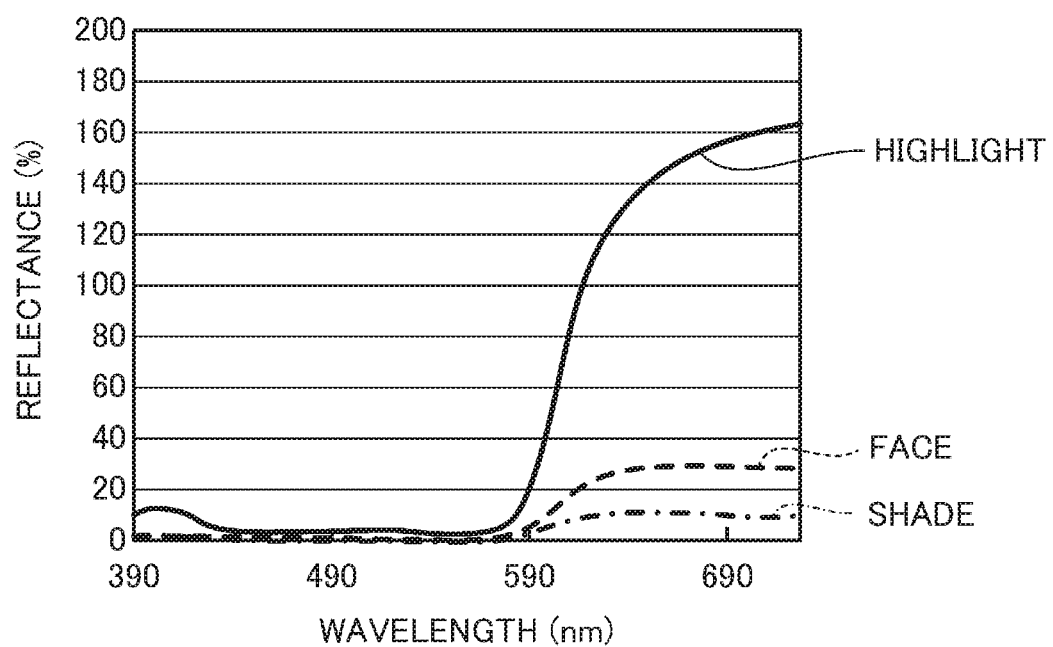
FIG. 6 is a graph illustrating an example of the spectral reflectance curves of the multilayer coating of the outer plate.

Referring to FIG. 5, the light reflected off the metallic base coating 4 transmits through the color-clear coating 5, and then transmits through the top clear coating 6 to exit to the outside. FIG. 6 illustrates an example of the spectral reflectance curves of light exiting from the top clear coating 6. In comparison between FIG. 4 and FIG. 6, the highlight reflectance is, in FIG. 6, relatively low across the whole range due to, e.g., influence of absorption and reflection of light by the pigment 8 contained in the color-clear coating 5.

According to FIG. 6, the highlight reflectance is high, the difference between the highlight reflectance and the shade reflectance and the difference between the highlight reflectance and the face reflectance are large, and almost no light other than red light exits from the multilayer coating 2. This shows that high lightness and high chroma at the highlight are achieved and that great appearance of depth is exhibited. Particularly in the case where the difference between the highlight reflectance and the face reflectance is large, the tone of color suddenly changes as the observation angle changes, and therefore great appearance of depth is exhibited.

[Planning of Conditions for Achieving Higher Lightness and Higher Chroma and for Exhibiting Appearance of Denseness and Appearance of Depth]

According to the foregoing study on the coloring mechanism, the highlight reflectance, shade reflectance, and face reflectance of light having a particular color, the transmittance of light having the particular color, and the transmittance of light having colors other than the particular color influence the lightness and chroma of a multilayer coating and the appearance of depth of the multilayer coating. Thus, plural samples of multilayer coatings of examples and comparative examples were prepared. The reflectance of each sample was measured, thereby evaluating the chroma, the appearance of depth, and the appearance of denseness.

Outer Plate No. 1 (Example)

In the coating composition illustrated in FIG. 1, a multilayer coating 2 was formed in such a manner that an intermediate coating 9 (having an L* value of 50) is stacked on an epoxy-based electrodeposited coating 3 formed on a surface of a steel plate 1, and then a metallic base coating 4, a color-clear coating 5, and a top clear coating 6 are stacked on the intermediate coating 9 in this order. A polyester-based solvent paint was used for the intermediate coating 9. The thickness of the intermediate coating 9 was 25 μm.

The metallic base coating 4 was formed of an acrylic melamine-based solvent paint by a rotary atomization type electrostatic coating apparatus. Such a paint was mixed with 10% (PWC) of aluminum flakes serving as a glittering material 7 and 15% (PWC) of a perylene-based pigment serving as a color pigment 8. The following coating conditions were set: a discharge rate of 330 cc/min; a rotational speed of 20000 rpm; and a shaping air (S/A) flow rate of 420 Nl/min. The thickness of the metallic base coating 4 was 12 μm.

The color-clear coating 5 was also formed of an acrylic melamine-based solvent paint by the rotary atomization type electrostatic coating apparatus. Such a paint was mixed with 2.0% (PWC) of a perylene-based pigment serving as a color pigment 8. The following coating conditions were set: a discharge rate of 300 cc/min; a rotational speed of 20000 rpm; and a S/A flow rate of 300 Nl/min. The thickness of the color-clear coating 5 was 12 μm.

The top clear coating 6 was formed of an acid epoxy-based clear paint. The thickness of the top clear coating 6 was 30 μm. The paint for intermediate coating, the paint for metallic base coating, the paint for color-clear coating, and the paint for top clear coating were applied using a wet-on-wet technique, and then were baked (heated for 20 minutes at a temperature of 140° C.).

Outer Plates Nos. 2-10 (Examples)

The orientation of the glittering material 7 of the outer plate No. 1 was changed in such a manner that the coating conditions for forming the metallic base coating 4 are adjusted. As a result, samples of outer plates Nos. 2-10 different from each other in the highlight reflectance, shade reflectance, and face reflectance of the metallic base coating 4 were prepared. The outer plates Nos. 2-10 are the same as the outer plate No. 1 in the compositions of the metallic base coating 4, the color-clear coating 5, the top clear coating 6, and the intermediate coating 9.

Outer Plate No. 11 (Example)

A multilayer coating (by a 3-coat-1-bake process) was formed in such a manner that an intermediate coating (having an L* value of 30) is stacked on an epoxy-based electrodeposited coating formed on a surface of a steel plate, and then a metallic base coating and a color-clear coating are stacked on the intermediate coating in this order. A polyester-based solvent paint was used for the intermediate coating. The thickness of the intermediate coating was 25 μm.

The metallic base coating was formed of an acrylic melamine-based solvent paint by the rotary atomization type electrostatic coating apparatus. Such a paint was mixed with 8% (PWC) of aluminum flakes serving as a glittering material and 14% (PWC) of a perylene-based pigment serving as a color pigment. The following coating conditions were set: a discharge rate of 330 cc/min; a rotational speed of 20000 rpm; and a S/A flow rate of 420 Nl/min. The thickness of the metallic base coating was 15 μm.

The color-clear coating was formed of an acid epoxy-based clear paint by the rotary atomization type electrostatic coating apparatus. Such a paint was mixed with 1.0% (PWC) of a perylene-based pigment serving as a color pigment. The following coating conditions were set: a discharge rate of 240 cc/min; a rotational speed of 22000 rpm; and a S/A flow rate of 250 Nl/min. The thickness of the color-clear coating was 30 μm. The paint for intermediate coating, the paint for metallic base coating, and the paint for color-clear coating were applied using the wet-on-wet technique, and then were baked (heated for 20 minutes at a temperature of 140° C.).

Outer Plate No. 12 (Example)

A multilayer coating (by a 5-coat-2-bake process) was formed in such a manner that an intermediate coating and a metallic base coating are formed as in the outer plate No. 11, and then a clear coating, a color-clear coating, and a top clear coating are stacked on the metallic base coating in this order.

The color-clear coating was formed of an acrylic melamine-based solvent paint by the rotary atomization type electrostatic coating apparatus. Such a paint was mixed with 2.0% (PWC) of a perylene-based pigment serving as a color pigment. The following coating conditions were set: a discharge rate of 330 cc/min; a rotational speed of 20000 rpm; and a S/A flow rate of 300 Nl/min. The thickness of the color-clear coating was 12 μm. The clear coating and the top clear coating were formed of an acid epoxy-based clear paint. The thickness of such coatings was 30 μm. The paint for intermediate coating, the paint for metallic base coating, and the paint for clear coating were applied using the wet-on-wet technique, and then were baked (heated for 20 minutes at a temperature of 140° C.). Moreover, the paint for color-clear coating and the paint for top clear coating were applied using the wet-on-wet technique, and then were re-baked (re-heated for 20 minutes at a temperature of 140° C.).

Commercially-Available Products Nos. 1 and 2 (Comparative Examples)

Two types of samples (Red Mica 1 and Red Mica 2) of commercially-available automobiles which are manufactured by another manufacturer and which are different from each other in coating color were prepared.

Applicant's Currently-Available Products Nos. 1 and 2 (Comparative Examples)

Samples (Red Mica and Red Metallic) of commercially-available automobiles which are manufactured by the applicant of the present application and which are different from each other in coating color were prepared.

Evaluation on Color Properties of Multilayer Coating

For each sample, highlight reflectance $R^{OH(P)}$, shade reflectance $R^{OS(P)}$, and face reflectance $R^{OF(P)}$ at the peak wavelength of a particular color and average highlight reflectance $R^{OH(OA)}$ in a complementary wavelength range were measured. Moreover, the chroma, the appearance of depth, and the appearance of denseness were visually evaluated for each sample. The reflectance was measured using Gonio-Spectrophotometric Color Measurement System GCMS-4 manufactured by Murakami Color Research Laboratory Co., Ltd. A measurement wavelength range was 400 to 700 nm.

Figure 7:
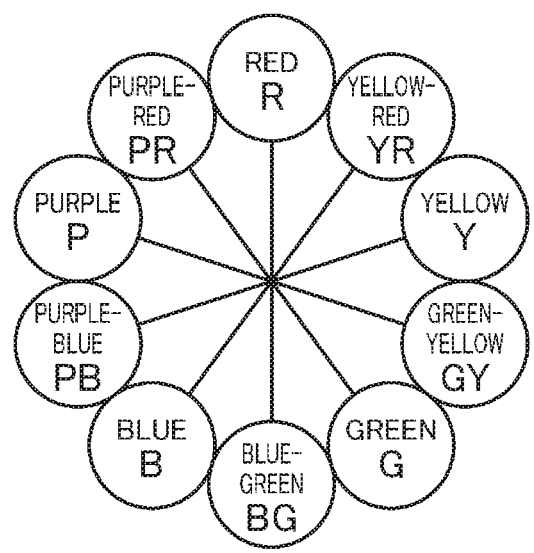
FIG. 7 is a diagram illustrating ten basic hues in a Munsell hue circle.

Referring to FIG. 7, ones of colors facing each other in a Munsell hue circle divided into ten hues are paired as complementary colors. For example, the hue of a complementary color of red R is blue-green BG, and a wavelength range including the hue of blue-green BG and the hues of blue B and green G which are respectively on both sides of the blue-green BG is the complementary wavelength range. According to Reference Drawing 1 of "General Hue Classification according to Colors" attached to JIS Z 8110, the relationship between a hue to which a particular color belongs and a complementary wavelength range in a measurement wavelength range of 400 to 700 nm is shown in Table 1.

The hue to which the particular color belongs was determined by Yxy measured based on the reflectance of an object obtained by the gonio-spectrophotometric color measurement system. The details thereof are described in "6. Determination on Color Notation" of "Color specification—Specification according to their three attributes" of JIS Z 8721. In the present specification, in order to determine the hue, color measurement of the samples was performed using a D65 light source at a field of view of 10 degrees, thereby obtaining Yxy.

TABLE 1

| HUE OF PARTICULAR COLOR | MUNSELL HUE NOTATION | MUNSELL HUE NOTATION IN COMPLEMENTARY WAVELENGTH RANGE | COMPLEMENTARY WAVELENGTH RANGE (nm) |
|---|---|---|---|
| RED | R | B, BG, G | 460~550 |
| YELLOW-RED | YR | PB, B, BG | 410~500 |
| YELLOW | Y | P, PB, B | 400~490 |
| GREEN-YELLOW | GY | PR, P, PB | 400~460 |
| GREEN | G | R, PR, P | 610~700 |
| BLUE-GREEN | BG | YR, R, PR | 580~700 |

TABLE 1-continued

| HUE OF PARTICULAR COLOR | MUNSELL HUE NOTATION | MUNSELL HUE NOTATION IN COMPLEMENTARY WAVELENGTH RANGE | COMPLEMENTARY WAVELENGTH RANGE (nm) |
|---|---|---|---|
| BLUE | B | Y, YR, R | 570~700 |
| PURPLE-BLUE | PB | GY, Y, YR | 550~610 |
| PURPLE | P | G, GY, Y | 490~590 |
| PURPLE-RED | PR | BG, G, GY | 480~570 |

The criteria for visual evaluation are as follows.

| | |
|---|---|
| Chroma | Double Circle: "Strong Sense of Brightness" |
| | White Circle: "Sense of Brightness" |
| | White Triangle: "Slight Sense of Brightness" |
| | Cross Mark: "No Sense of Brightness" |
| Depth | Double Circle: "Strong Sense of Depth" |
| | White Circle: "Sense of Depth" |
| | White Triangle: "Slight Sense of Depth" |
| | Cross Mark: "No Sense of Depth" |
| Denseness | Double Circle: "No Sense of Granularity" |
| | White Circle: "Slight Sense of Granularity" |
| | White Triangle: "Sense of Granularity" |
| | Cross Mark: "Strong Sense of Granularity" |

Measurement and Evaluation Results

Figure 8:
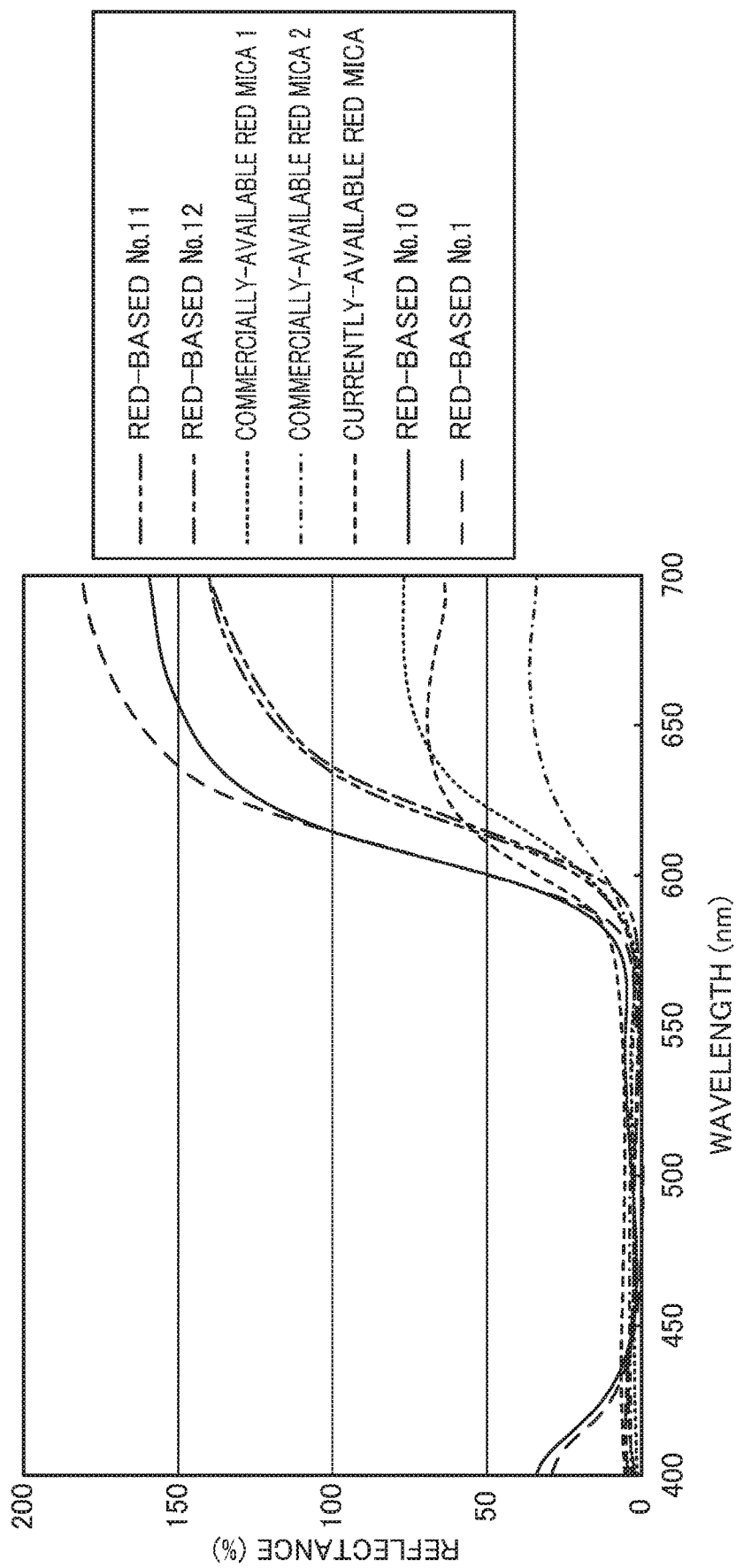
FIG. 8 is a graph illustrating the spectral highlight-reflectance curves of red-based samples.
Figure 9:
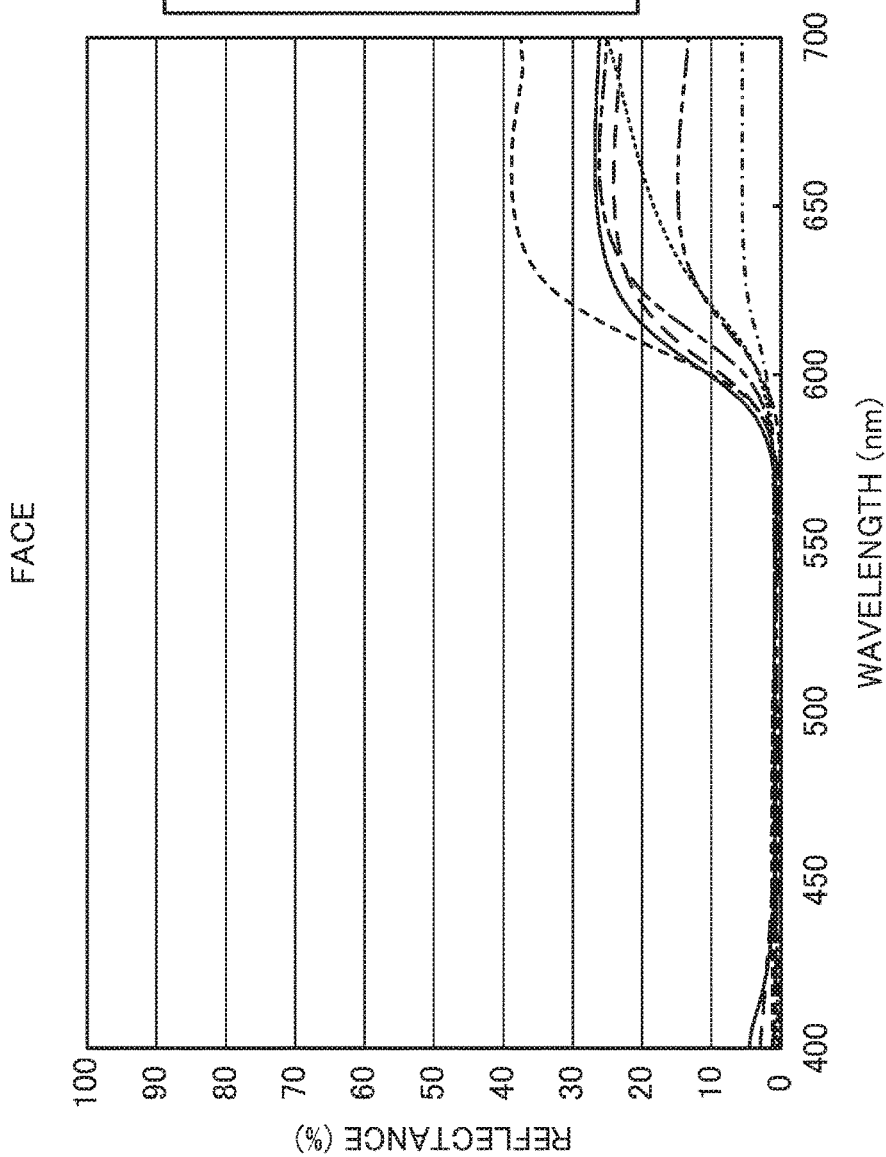
FIG. 9 is a graph illustrating the spectral face-reflectance curves of the red-based samples.
Figure 10:
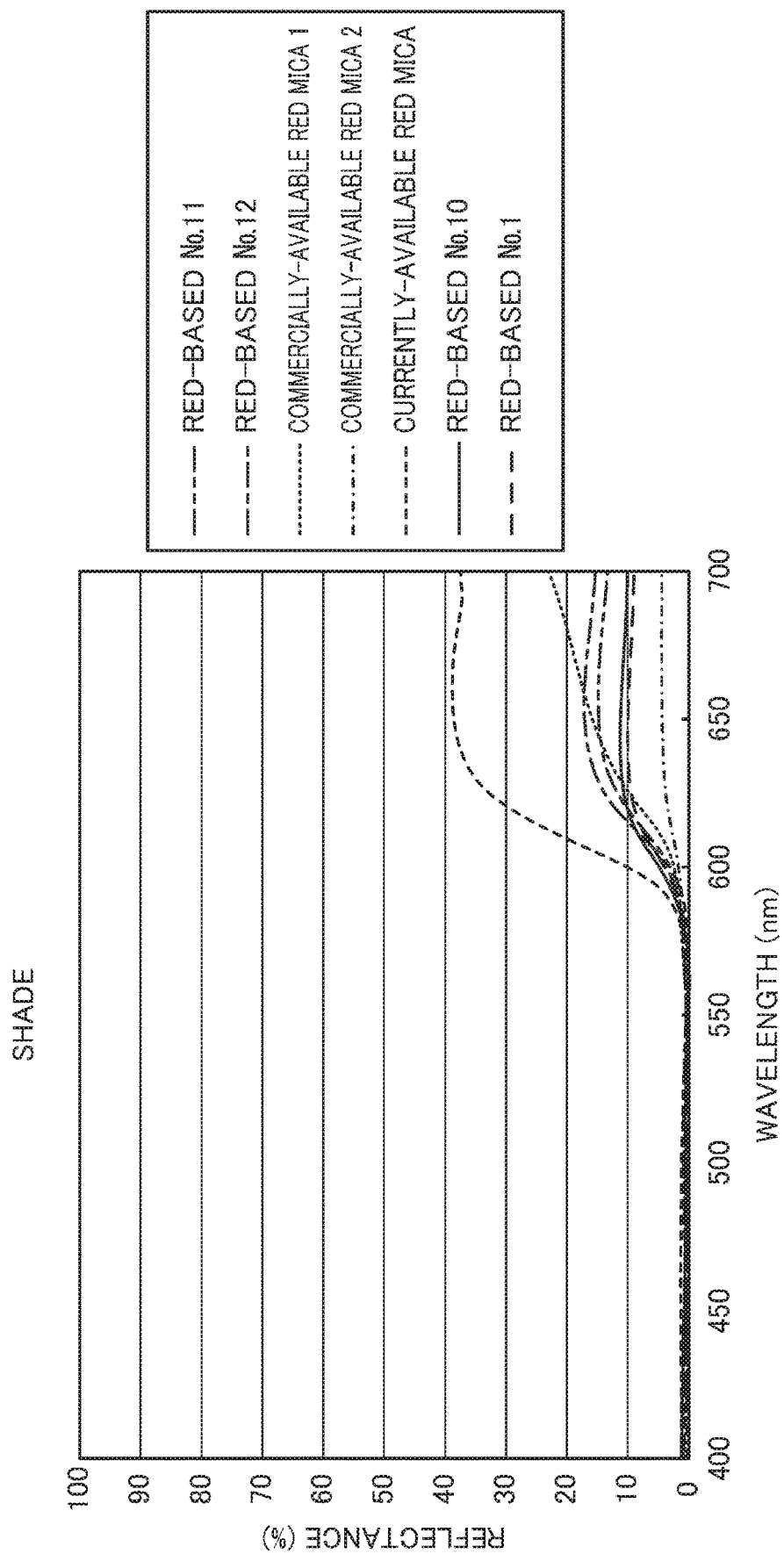
FIG. 10 is a graph illustrating the spectral shade-reflectance curves of the red-based samples.

Measurement and evaluation results of the foregoing color properties are shown in Table 2. FIGS. 8, 9, and 10 illustrate spectral reflectance curves showing the highlight reflectance, face reflectance, and shade reflectance of some of the samples.

TABLE 2

| | | PEAK WAVELENGTH | | | COMPLEMENTARY WAVELENGTH RANGE | VISUAL EVALUATION | |
|---|---|---|---|---|---|---|---|
| | | ① HIGHLIGHT REFLECTANCE | ② FACE REFLECTANCE | ③ SHADE REFLECTANCE | ④ AVERAGE REFLECTANCE | | |
| OUTER PLATE | | R (%) $R^{OH(P)}$ | R (%) $R^{OF(P)}$ | R (%) $R^{OS(P)}$ | (HIGHLIGHT) $R^{OH(OA)}$ | CHROMA | APPEARANCE OF DEPTH |
| RED-BASED SAMPLE | No. 1 | 180.7 | 23.2 | 8.8 | 1.4 | ◎ | ◎ |
| | No. 2 | 148.8 | 25.2 | 9.8 | 1.6 | ○ | ○ |
| | No. 3 | 130.5 | 27.4 | 10.7 | 1.3 | ○ | ○ |
| | No. 4 | 132.9 | 26.7 | 10.7 | 1.4 | ○ | ○ |
| | No. 5 | 153.2 | 25.3 | 9.9 | 1.4 | ○ | ○ |
| | No. 6 | 138.4 | 27.5 | 10.6 | 1.1 | ◎ | ○ |
| | No. 7 | 148.0 | 26.9 | 10.2 | 2.0 | ○ | ○ |
| | No. 8 | 151.3 | 24.7 | 9.7 | 1.0 | ◎ | ○ |
| | No. 9 | 148.0 | 26.1 | 10.0 | 1.6 | ○ | ○ |
| | No. 10 | 158.8 | 26.3 | 9.8 | 2.1 | ○ | ○ |
| | No. 11 | 139.4 | 22.9 | 13.4 | 0.5 | ◎ | ◎ |
| | No. 12 | 140.4 | 24.9 | 15.3 | 0.7 | ◎ | ◎ |
| COMMERCIALLY-AVAILABLE PRODUCTS | RED MICA 1 | 77.0 | 22.1 | 19.8 | 1.1 | △ | △ |
| | RED MICA 2 | 34.8 | 5.5 | 4.3 | 0.9 | △ | △ |
| CURRENTLY-AVAILABLE PRODUCTS | RED MICA | 73.4 | 37.0 | 35.6 | 4.2 | X | X |
| | RED METALLIC | 62.0 | 9.0 | 3.0 | 2.0 | △ | △ |
| OPTIMAL RANGE | FAVORABLE RANGE | | | | ≤3 | | |
| | BEST RANGE | | | | ≤3 | | |

TABLE 2-continued

| | | | CONDITIONS FOR COLORING | | |
|---|---|---|---|---|---|
| OUTER PLATE | | VISUAL EVALUATION APPEARANCE OF DENSENESS | CONDITION A VALUE FOR HIGH CHROMA $R^{OH(P)}/R^{OH(OA)}$ | CONDITION B VALUE FOR APPEARANCE OF DEPTH $A \times (R^{OH(P)} - R^{OS(P)})/100$ | CONDITION C VALUE FOR GREAT APPEARANCE OF DEPTH $B/R^{OF(P)}$ |
| RED-BASED SAMPLE | No. 1 | ◉ | 129.1 | 221.9 | 9.6 |
| | No. 2 | ○ | 93.0 | 129.3 | 5.1 |
| | No. 3 | ○ | 100.4 | 120.3 | 4.4 |
| | No. 4 | ○ | 94.9 | 116.0 | 4.3 |
| | No. 5 | ◉ | 109.4 | 156.8 | 6.2 |
| | No. 6 | ○ | 125.8 | 160.8 | 5.8 |
| | No. 7 | ○ | 74.0 | 102.0 | 3.8 |
| | No. 8 | ○ | 151.3 | 214.2 | 8.7 |
| | No. 9 | ○ | 92.5 | 127.7 | 4.9 |
| | No. 10 | ○ | 75.6 | 112.7 | 4.3 |
| | No. 11 | ◉ | 278.8 | 351.3 | 15.3 |
| | No. 12 | ◉ | 200.6 | 250.9 | 10.1 |
| COMMERCIALLY-AVAILABLE PRODUCTS | RED MICA 1 | X | 70.0 | 40.0 | 1.8 |
| | RED MICA 2 | X | 38.7 | 11.8 | 2.1 |
| CURRENTLY-AVAILABLE PRODUCTS | RED MICA | X | 17.5 | 6.6 | 0.2 |
| | RED METALLIC | X | 31.0 | 18.3 | 2.0 |
| OPTIMAL RANGE | FAVORABLE RANGE | | ≥74 | >100 | ≥3 |
| | BEST RANGE | | >120 | >150 | >8 |

According to the relationship between the highlight reflectance $R^{OH(P)}$ at the peak wavelength of the particular color and the visually-evaluated chroma as shown in Table 2, e.g., Red Mica of the currently-available products has relatively-high highlight reflectance $R^{OH(P)}$, but has low visually-evaluated chroma. This shows that high chroma cannot be achieved only with high highlight reflectance $R^{OH(P)}$.

When Condition A (=$R^{OH(P)}/R^{OH(OA)}$) is high, the evaluated chroma tends to be relatively high, and favorable appearance of denseness is exhibited. According to the results of Table 1, Condition A is preferably equal to or greater than 74, and more preferably greater than 120.

In terms of the shade reflectance $R^{OS(P)}$, the tendency shows that a greater difference between the highlight reflectance $R^{OH(P)}$ and the shade reflectance $R^{OS(P)}$ results in greater appearance of depth. Red Mica of the currently-available products has a greater difference ($R^{OH(P)}-R^{OS(P)}$) between the highlight reflectance $R^{OH(P)}$ and the shade reflectance $R^{OS(P)}$ as compared to that of Red Mica 2 of the commercially-available products, but the appearance of depth of Red Mica of the currently-available products in visual evaluation has a lower rating than that of Red Mica 2 of the commercially-available products. This shows that the appearance of depth cannot be exhibited only with a great difference between the highlight reflectance and the shade reflectance. A greater value for Condition B (($R^{OH(P)}/R^{OH(OA)})\times(R^{OH(P)}-R^{OS(P)})\times1/100$) results in higher chroma and greater appearance of depth in visual evaluation. That is, not only a great difference between the highlight reflectance and the shade reflectance but also high chroma are required for greater appearance of depth. According to the results of Table 2, Condition B is preferably greater than 100, and more preferably greater than 150.

In terms of the face reflectance $R^{OF(P)}$, the outer plates Nos. 1 to 12 are at the substantially same level as Red Mica 1 of the commercially-available products. However, the appearance of depth and the appearance of denseness are better in the outer plates Nos. 1 to 12 than in Red Mica 1 of the commercially-available products. This is because the difference between the highlight reflectance $R^{OH(P)}$ and the face reflectance $R^{OF(P)}$ is great. That is, a greater value for Condition C (($R^{OH(P)}/R^{OH(OA)})\times(R^{OH(P)}-R^{OS(P)})\times(1/R^{OF(P)})\times(1/100)$) taking the face reflectance $R^{OF(P)}$ into consideration results in greater appearance of depth and greater appearance of denseness. According to the results of Table 1, Condition C is preferably equal to or greater than 3, and more preferably greater than 8.

The average highlight reflectance $R^{OH(OA)}$ in the complementary wavelength range is preferably equal to or less than 3%.

(Composition of Coating of Inner Plate Part)

Figure 11:
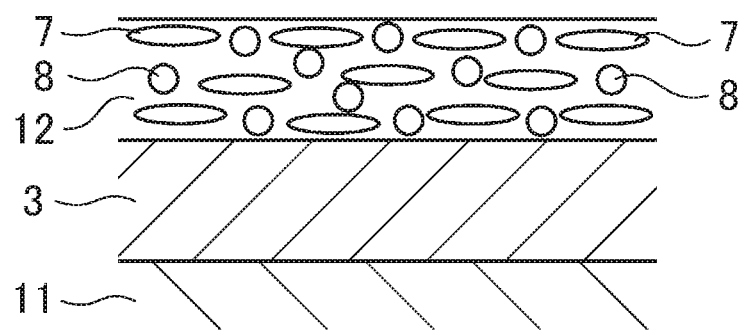
FIG. 11 is a cross-sectional view illustrating the structure of a coating of an inner plate part.

FIG. 11 schematically illustrates an example of a coating 12 formed on an outer surface of an inner plate part (steel plate) 11. The coating 12 contains a glittering material 7 and a red pigment 8. An electrodeposited coating 3 is formed on the surface of the inner plate part 11 by cation electrodeposition coating, and the coating 12 is formed on the electrodeposited coating 3. A color-clear coating and a top clear coating are not formed.

[Coloring Properties and Strength of Coating of Inner Plate Part]

The present invention relates to the coating 12 of the inner plate part 11, and aims to ensure coloring properties at such a level that the coating 12 of the inner plate part 11 is not inferior in appearance than the multilayer coating 2 of the outer plate 1 and to enhance coating strength. Thus, in order to produce a particular color similar to that of the multilayer coating 2 of the outer plate 1, the coating 12 of the inner plate part 11 contains, as pigments, a perylene-based pigment and an iron oxide-based pigment, the content of the perylene-based pigment is equal to or higher than 10% and equal to or lower than 14% in units of PWC, and the mass ratio of the content of the iron oxide-based pigment to the content of the perylene-based pigment is equal to or higher than 3% and equal to or lower than 20%.

Plural samples of coatings of examples and comparative examples were prepared. The coloring properties and strength of these samples were evaluated by reflectance measurement and an abrasion test.

Inner Plate Part No. 1 (Comparative Example)

In the coating composition illustrated in FIG. 11, a coating 12 was formed on an epoxy-based electrodeposited coating 3 formed on a surface of a steel plate 11.

The coating 12 was formed of an acrylic melamine-based solvent paint by the rotary atomization type electrostatic coating apparatus. Such a paint was mixed with 6.2% (PWC) of aluminum flakes serving as a glittering material 7, 14.4% (PWC) of a perylene-based pigment serving as a color pigment 8, and 2.7% (PWC) of a quinacridone-based pigment. The ratio of the content of the perylene-based pigment to the total amount of the pigment 8 and the glittering material 7 was 61.8% by mass. No iron oxide-based pigment was contained. The following coating conditions were set: a discharge rate of 400 cc/min; a rotational speed of 20000 rpm; and a S/A flow rate of 420 Nl/min. The thickness of the coating 12 was 15 μm.

Inner Plate Parts Nos. 3, 4, and 7 to 10 (Examples) and Inner Plate Parts Nos. 2, 5, 6, 11, and 12 (Comparative Examples)

Coatings 12 of inner plate parts Nos. 2 to 12 different from each other in compositions of a pigment and a glittering material were formed. The compositions etc. of the pigment and the glittering material of the inner plate parts Nos. 1 to 12 are shown in Table 3. Coating conditions other than the compositions of the pigment and the glittering material of the inner plate parts Nos. 2 to 12 are the same as those of the inner plate part No. 1. An iron oxide-based pigment A has an average particle size of equal to or greater than 50 nm and equal to or less than 60 nm, and the specific gravity of the iron oxide-based pigment A is 4.2. An iron oxide-based pigment B has an average particle size of equal to or greater than 10 nm and equal to or less than 20 nm, and the specific gravity of the iron oxide-based pigment B is 3.9. The perylene-based pigment has an average particle size of equal to or greater than 40 nm and equal to or less than 50 nm, and the specific gravity of the perylene-based pigment is 1.2.

TABLE 3

| INNER PLATE PART | | No. 1 | No. 2 | No. 3 | No. 4 | No. 5 | No. 6 | No. 7 |
|---|---|---|---|---|---|---|---|---|
| PIGMENT PWC (%) | PERYLENE-BASED | 14.4 | 12.7 | 12.4 | 10.6 | | 7.5 | 12.3 |
| | DIKETOPYRROLOPYRROLE-BASED | | | | | 1.2 | | |
| | QUINACRIDONE-BASED | 2.7 | 2.2 | 2.2 | 1.6 | 4.3 | 1.0 | |
| | CARBON-BASED | | | | 0.1 | | 0.1 | |
| | IRON OXIDE-BASED A | | | | 0.7 | 2.5 | | 0.4 |
| | IRON OXIDE-BASED B | | | | | 1.1 | | |
| GLITTERING MATERIAL PWC (%) | ALUMINUM | 6.2 | 5.2 | 4.8 | 3.9 | 2.6 | 1.2 | 5.2 |
| | MICA | | | | | 2.8 | 3.1 | 10.4 |
| TOTAL OF PIGMENT AND GLITTERING MATERIAL PWC (%) | | 23.3 | 20.1 | 20.1 | 20.1 | 13.7 | 20.2 | 20.1 |
| (PERYLENE-BASED/TOTAL OF PIGMENT AND GLITTERING MATERIAL) (%) | | 61.8 | 63.2 | 61.7 | 52.7 | 0.0 | 33.0 | 61.2 |
| (IRON OXIDE-BASED/PERYLENE-BASED) (%) | | | | 5.6 | 10.4 | | | 3.3 |
| COLORING PROPERTIES | HIGHLIGHT REFLECTANCE RATIO (INNER PLATE PART/OUTER PLATE) (PEAK WAVELENGTH) | 0.85 | 0.76 | 0.60 | 0.78 | 0.30 | 0.70 | 0.73 |
| | HIGHLIGHT REFLECTANCE RATIO (INNER PLATE PART/OUTER PLATE) (COMPLEMENTARY WAVELENGTH RANGE) | 3.58 | 3.26 | 4.02 | 5.03 | 3.06 | 9.10 | 3.37 |
| | FACE REFLECTANCE RATIO (INNER PLATE PART/OUTER PLATE) (PEAK WAVELENGTH) | 1.04 | 1.01 | 1.22 | 0.93 | 1.00 | 0.70 | 1.11 |
| | SHADE REFLECTANCE RATIO (INNER PLATE PART/OUTER PLATE) (PEAK WAVELENGTH) | 1.23 | 1.23 | 1.64 | 1.07 | 2.15 | 0.80 | 1.17 |
| | VISUAL EVALUATION | ○ | ○ | ○ | ○ | X | X | ○ |
| COATING STRENGTH | AMOUNT OF WORN-OUT COATING (μm) | 2.5 | 1.8 | 1.3 | 1.5 | 0.9 | 0.9 | 1.6 |
| OVERALL EVALUATION | | X | Δ | ⊚ | ○ | X | X | ○ |

| INNER PLATE PART | | No. 8 | No. 9 | No. 10 | No. 11 | No. 12 |
|---|---|---|---|---|---|---|
| PIGMENT PWC (%) | PERYLENE-BASED | 12.0 | 11.2 | 10.7 | 9.7 | 9.2 |
| | DIKETOPYRROLOPYRROLE-BASED | | | | | |
| | QUINACRIDONE-BASED | | | | | |
| | CARBON-BASED | | | | | |
| | IRON OXIDE-BASED A | 0.7 | 1.5 | 2.0 | 3.0 | 3.5 |
| | IRON OXIDE-BASED B | | | | | |
| GLITTERING MATERIAL PWC (%) | ALUMINUM | 5.2 | 5.2 | 5.2 | 5.2 | 5.2 |
| | MICA | | | | | |
| TOTAL OF PIGMENT AND GLITTERING MATERIAL PWC (%) | | 20.1 | 20.1 | 20.1 | 20.1 | 20.1 |
| (PERYLENE-BASED/TOTAL OF PIGMENT AND GLITTERING MATERIAL) (%) | | 59.7 | 55.7 | 53.2 | 48.3 | 45.8 |
| (IRON OXIDE-BASED/PERYLENE-BASED) (%) | | 5.8 | 13.4 | 18.7 | 30.9 | 38.0 |
| COLORING PROPERTIES | HIGHLIGHT REFLECTANCE RATIO (INNER PLATE PART/OUTER PLATE) (PEAK WAVELENGTH) | 0.65 | 0.56 | 0.52 | 0.47 | 0.36 |
| | HIGHLIGHT REFLECTANCE RATIO (INNER PLATE PART/OUTER PLATE) (COMPLEMENTARY WAVELENGTH RANGE) | 3.72 | 3.98 | 3.69 | 3.30 | 2.58 |
| | FACE REFLECTANCE RATIO (INNER PLATE PART/OUTER PLATE) (PEAK WAVELENGTH) | 1.10 | 1.10 | 1.11 | 1.16 | 1.22 |
| | SHADE REFLECTANCE RATIO | 1.53 | 1.78 | 1.88 | 2.09 | 2.12 |

TABLE 3-continued

|  |  |  |  |  |  |  |
|---|---|---|---|---|---|---|
| (INNER PLATE PART/OUTER PLATE) (PEAK WAVELENGTH) | | | | | | |
| | VISUAL EVALUATION | ○ | ○ | ○ | △ | X |
| COATING STRENGTH | AMOUNT OF WORN-OUT COATING (μm) | 1.3 | 1.1 | 1.0 | 0.8 | 0.7 |
| OVERALL EVALUATION | | ◎ | ◎ | ◎ | △ | X |

Evaluation on Coloring Properties

For each sample, highlight reflectance $R^{IH(P)}$, shade reflectance $R^{IS(P)}$, and face reflectance $R^{IF(P)}$ at the peak wavelength of a particular color and average highlight reflectance $R^{IH(OA)}$ in a complementary wavelength range were measured. Moreover, the followings were obtained: the ratio ($R^{IH(P)}/R^{OH(P)}$) of the highlight reflectance of each of the inner plate parts Nos. 1 to 12 at the peak wavelength of the particular color to the highlight reflectance of the outer plate No. 1 at the peak wavelength of the particular color; the ratio $R^{IH(OA)}/R^{OH(OA)}$) of the average highlight reflectance of each of the inner plate parts Nos. 1 to 12 in the complementary wavelength range to the average highlight reflectance of the outer plate No. 1 in the complementary wavelength range; the ratio ($R^{IF(P)}/R^{OF(P)}$) of the face reflectance of each of the inner plate parts Nos. 1 to 12 at the peak wavelength of the particular color to the face reflectance of the outer plate No. 1 at the peak wavelength of the particular color; and the ratio ($R^{IS(P)}/R^{OS(P)}$) of the shade reflectance of each of the inner plate parts Nos. 1 to 12 at the peak wavelength of the particular color to the shade reflectance of the outer plate No. 1 at the peak wavelength of the particular color. Further, the coloring properties of each sample were visually evaluated. The reflectance was measured using Gonio-Spectrophotometric Color Measurement System GCMS-4 manufactured by Murakami Color Research Laboratory Co., Ltd. A measurement wavelength range was 400 to 700 nm.

Figure 12:
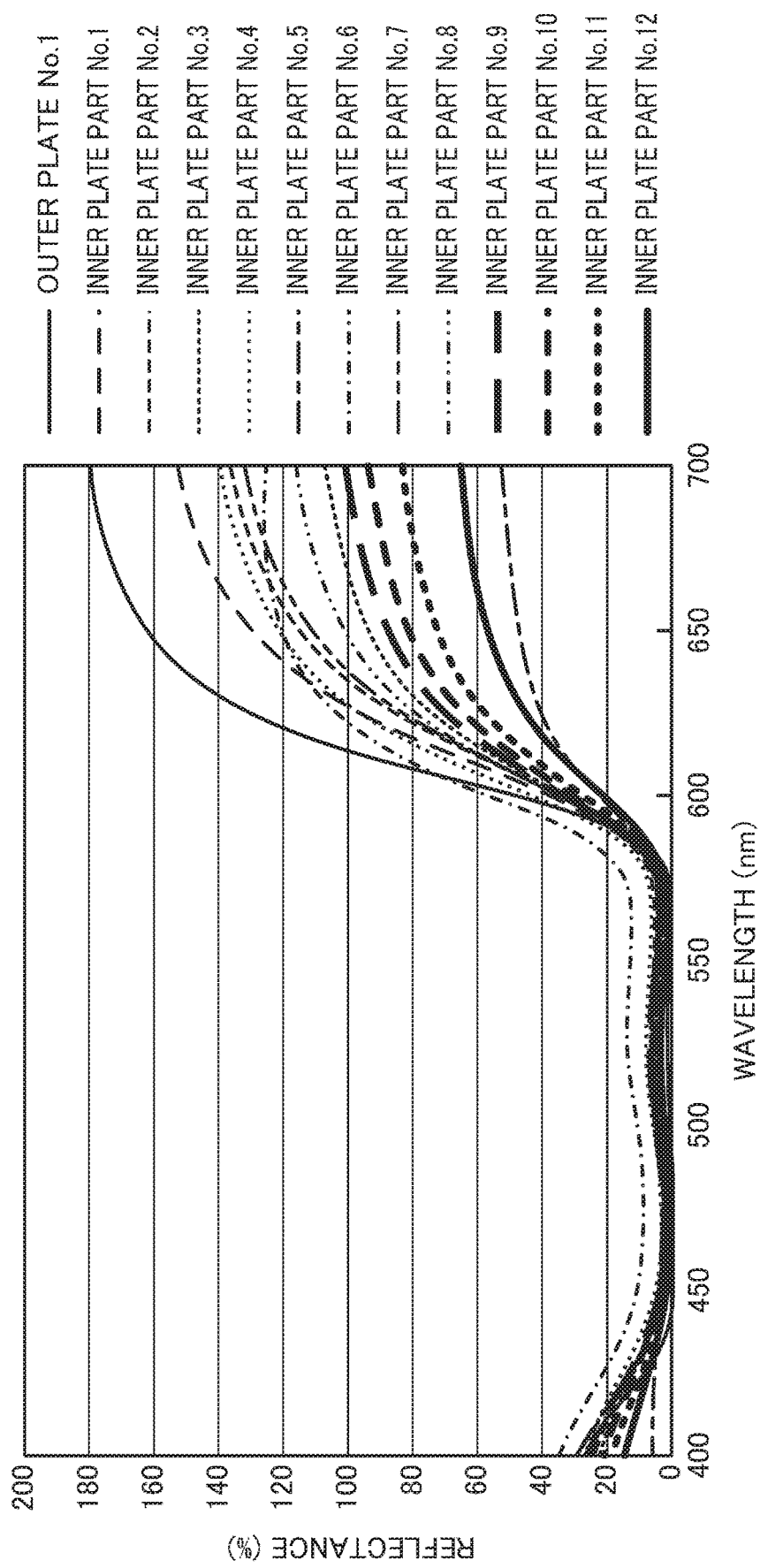
FIG. 12 is a graph illustrating the spectral highlight-reflectance curves of coatings of an outer plate and inner plate parts.
Figure 13:
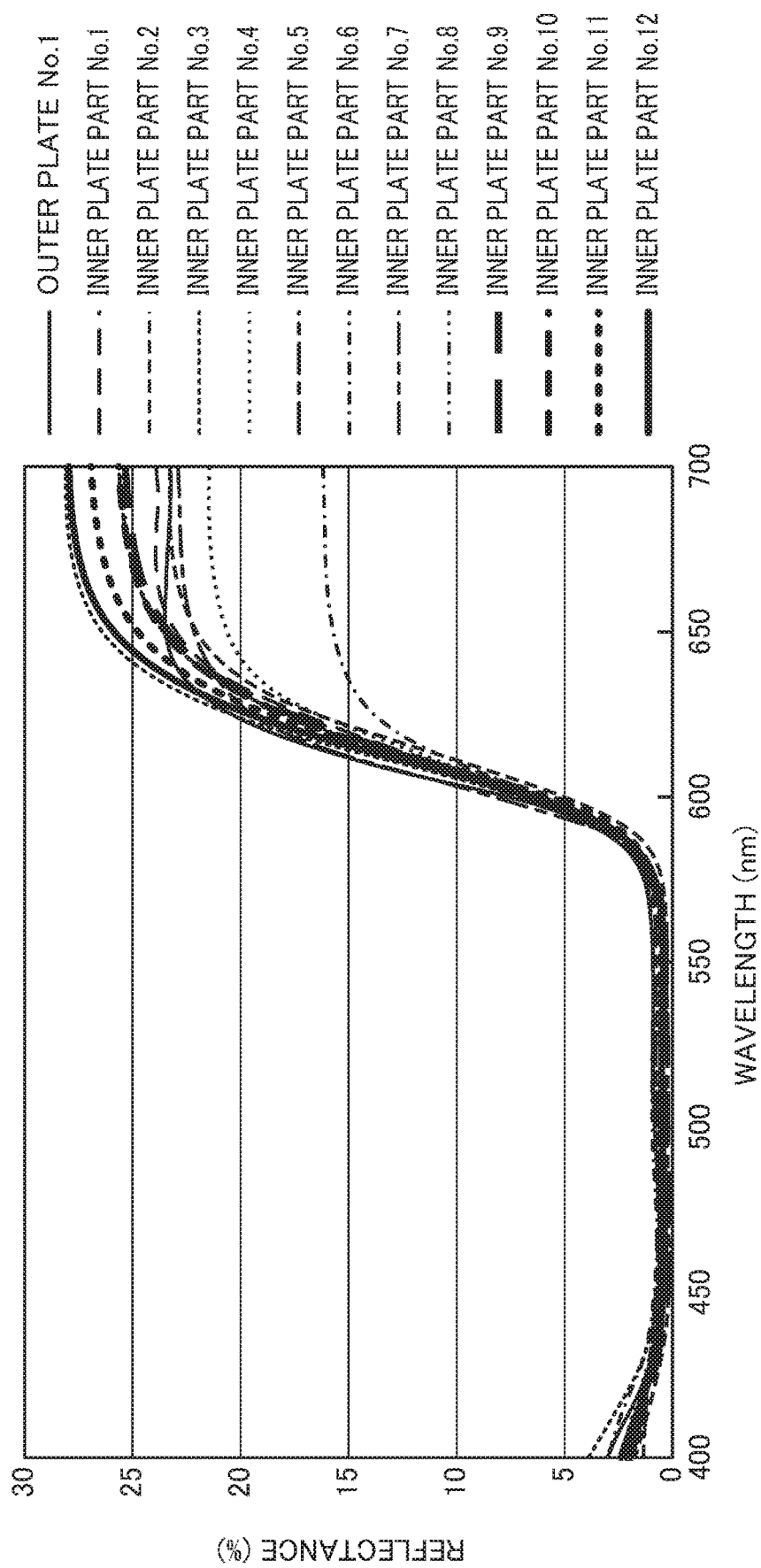
FIG. 13 is a graph illustrating the spectral face-reflectance curves of the coatings of the outer plate and the inner plate parts.
Figure 14:
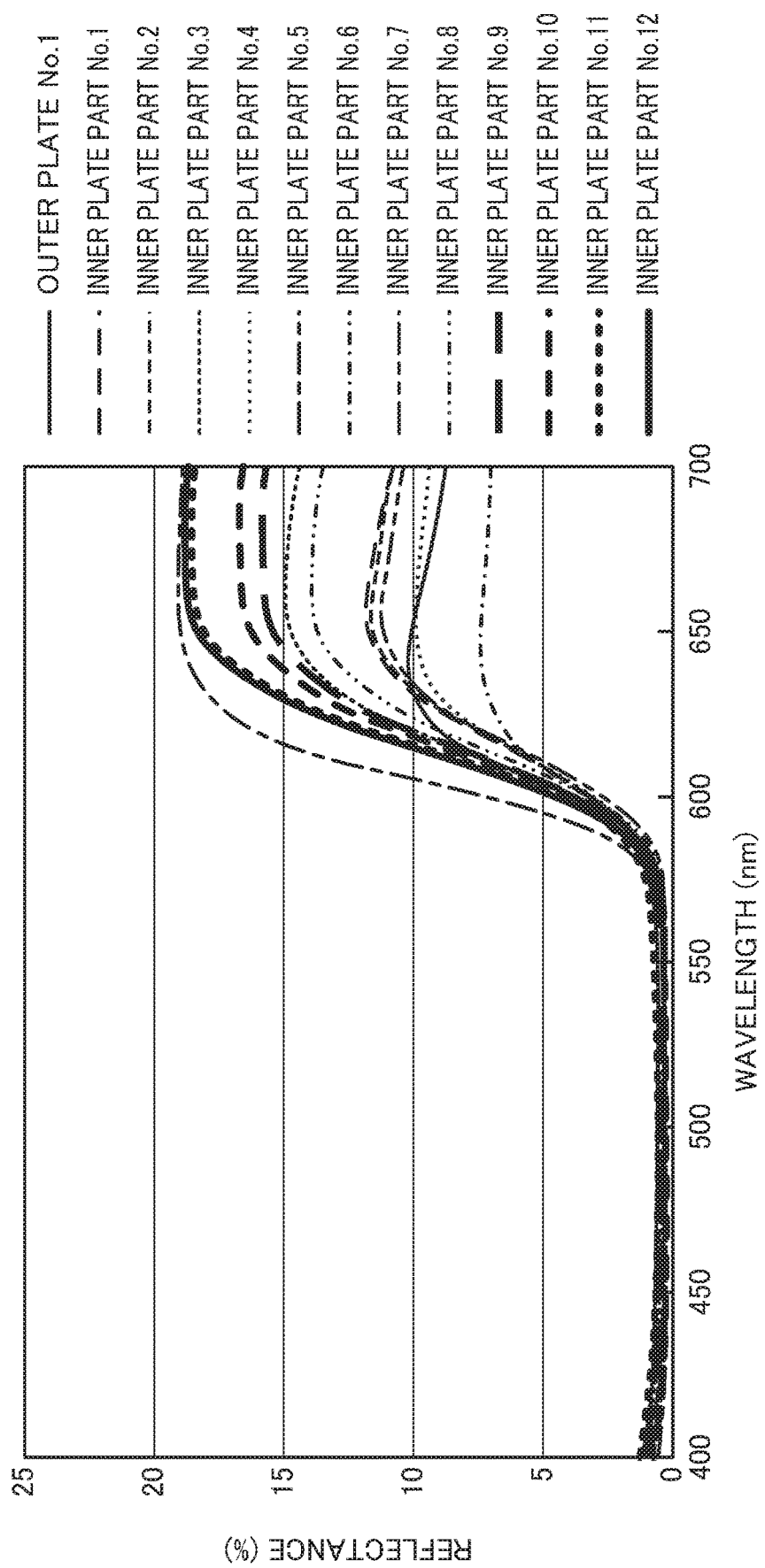
FIG. 14 is a graph illustrating the spectral shade-reflectance curves of the coatings of the outer plate and the inner plate parts.

FIG. 12 illustrates the spectral reflectance curves of the highlight reflectance of the outer plate No. 1 and the inner plate parts Nos. 1 to 12, FIG. 13 illustrates the spectral reflectance curves of the face reflectance of the outer plate No. 1 and the inner plate parts Nos. 1 to 12, and FIG. 14 illustrates the spectral reflectance curves of the shade reflectance of the outer plate No. 1 and the inner plate parts Nos. 1 to 12.

The criteria for visual evaluation are as follows.

Criteria for Visual Evaluation on Coloring Properties

White Circle: No Sense of Discomfort at Inner Plate Part Coating Color as compared to Outer Plate Coating Color White Triangle: Slight Sense of Discomfort at Inner Plate Part Coating Color as compared to Outer Plate Coating Color Cross Mark: Sense of Discomfort at Inner Plate Part Coating Color as compared to Outer Plate Coating Color Evaluation on Coating Strength The coating strength of each of the inner plate parts Nos. 1 to 12 was evaluated by an abrasion test using a JSPS-type rubbing tester. That is, a sheet of abrasive paper having a mesh count of #1000 and having an area of 20×20 mm was used as a friction element, and the amount of worn-out coating was measured by a film thickness meter when the friction element has horizontally reciprocated on a coating surface of the inner plate part under the following conditions: a load was 200 g; a moving distance per reciprocation was 240 mm; the number of reciprocations per minute was 30; and the total number of reciprocations was 300. The amount of worn-out coating every 100 reciprocations was obtained. The number of measurement points was 12. The coating strength was evaluated based on the amount of worn-out coating.

Measurement and Evaluation Results

Table 3 shows the reflectance ratio, the visual evaluation results, the amount of worn-out coating, and the overall evaluation results. Criteria for overall evaluation are as follows.

Double Circle: Excellent Coloring Properties and Coating Strength

White Circle: Favorable Coloring Properties and Coating Strength

White Triangle: Poor Coloring Properties or Coating Strength

Cross Mark: Inferior Coloring Properties or Coating Strength

Figure 15:
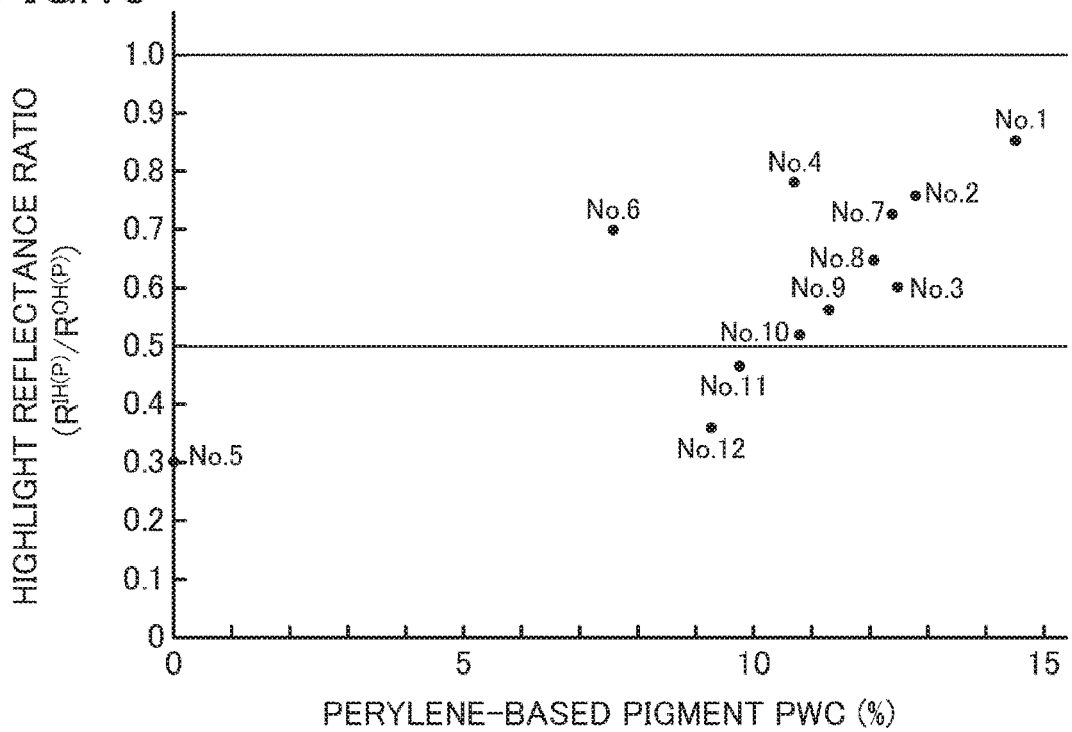
FIG. 15 is a graph illustrating the relationship between the content of a perylene-based pigment of the coating of each inner plate part and a highlight reflectance ratio ($R^{IH(P)}/R^{OH(P)}$).

FIG. 15 illustrates the relationship between the content (PWC) of the perylene-based pigment of the coating of each of the inner plate parts Nos. 1 to 12 and the highlight reflectance ratio ($R^{IH(P)}/R^{OH(P)}$) at the peak wavelength of the particular color. A greater content of the perylene-based pigment results in a lower highlight reflectance ratio. Note that, in the inner plate part No. 6, the content of the perylene-based pigment was decreased and the content of mica was increased.

In the example inner plate parts Nos. 3, 4, and 7 to 10 having a perylene-based pigment content of equal to or higher than 10% and equal to or lower than 14% in units of PWC (i.e., the ratio of the content of the perylene-based pigment to the total amount of the pigment and the glittering material is equal to or higher than 50% by mass), the highlight reflectance ratio at the peak wavelength of the particular color is equal to or higher than 0.5 and equal to or lower than 1.0. According to Table 3, in the example inner plate parts Nos. 3, 4, and 7 to 10, the average highlight reflectance ratio ($R^{IH(OA)}/R^{OH(OA)}$) in the complementary wavelength range is equal to or higher than 1.0 and equal to or lower than 6.0. That is, as in the outer plate No. 1, the example inner plate parts Nos. 3, 4, and 7 to 10 is more likely to reflect red light of visible light (400 to 700 nm), and is less likely to reflect light other than red light. Thus, there is almost no sense of discomfort at the color tone of the inner plate part as compared to that of the outer plate.

According to Table 3, there is almost no face reflectance difference and no shade reflectance difference between each of the example inner plate parts Nos. 3, 4, and 7 to 10 and the outer plate No. 1 (0.7≤Face Reflectance Ratio≤1.3 and 1.0≤Shade Reflectance Ratio≤2.0). This shows that there is no sense of discomfort at the color tone of the inner plate part.

Figure 16:
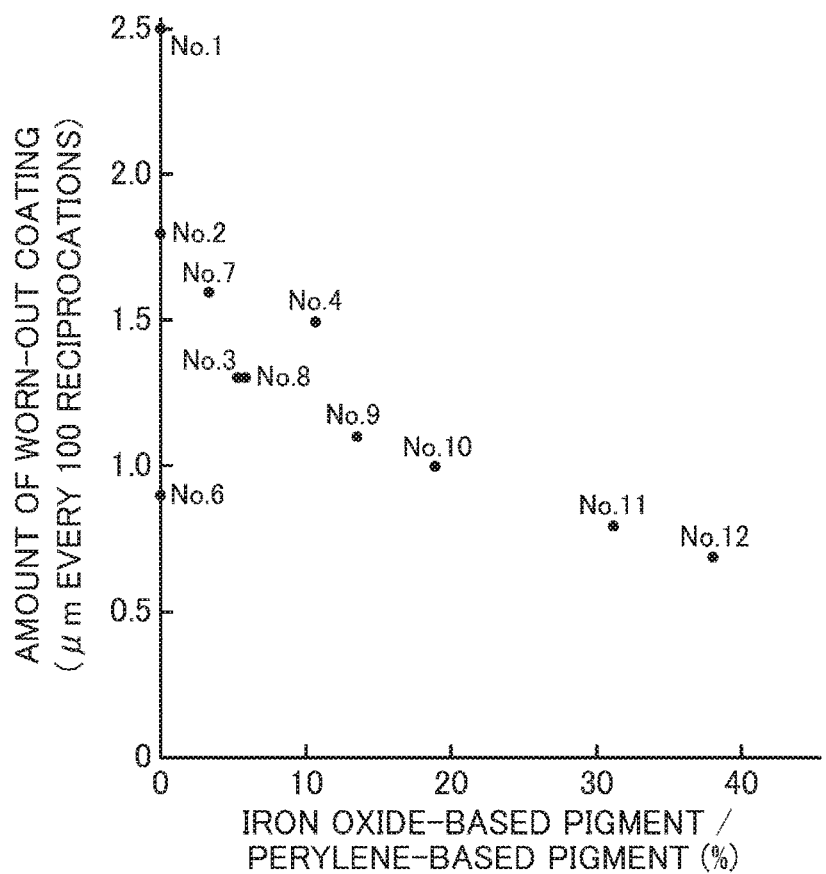
FIG. 16 is a graph illustrating the relationship between the mass ratio of an iron oxide-based pigment to the perylene-based pigment in the coating of each inner plate part and the amount of worn-out coating.

FIG. 16 illustrates the relationship between the mass ratio (%) of the iron oxide-based pigment to the perylene-based pigment and the amount of worn-out coating of the inner plate part. A higher percentage of the iron oxide-based pigment to the perylene-based pigment results in a smaller amount of worn-out coating and higher coating strength. However, referring to FIG. 17, a higher percentage of the iron oxide-based pigment to the perylene-based pigment results in a higher highlight reflectance ratio ($R^{IH(P)}/R^{OH(P)}$) at the peak wavelength of the particular color. This is because the iron oxide-based pigment has lower coloring properties of red than those of the perylene-based pigment. FIG. 18 similarly illustrates such a relationship (i.e., the relationship between the content (PWC) of the iron oxide-based pigment and the highlight reflectance ratio ($R^{IH(P)}/R^{OH(P)}$) at the peak wavelength of the particular color).

Figure 17:
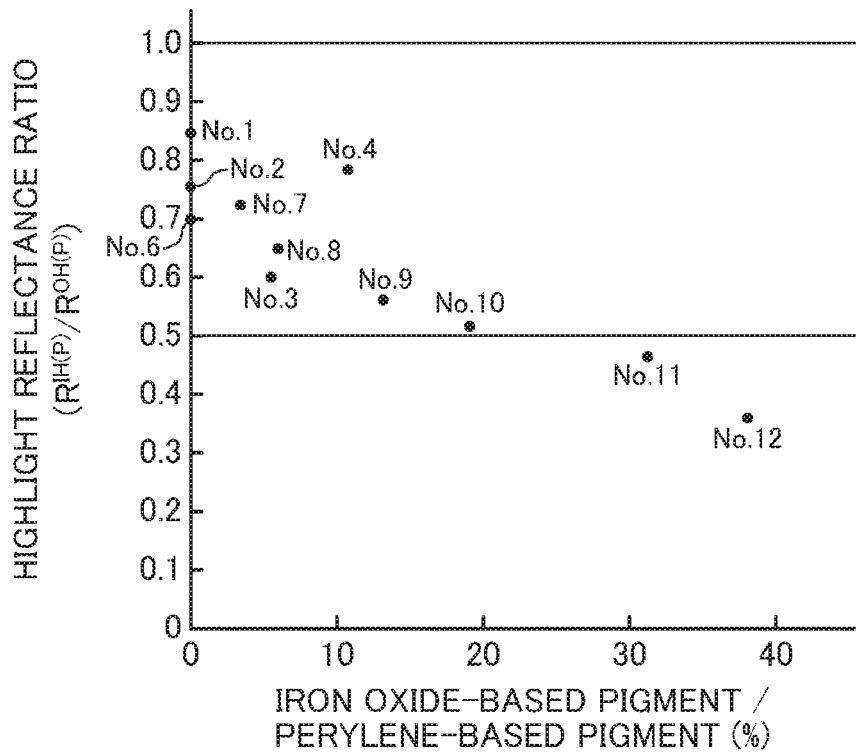
FIG. 17 is a graph illustrating the relationship between the mass ratio of the iron oxide-based pigment to the perylene-based pigment in the coating of each inner plate part and the highlight reflectance ratio ($R^{IH(P)}/R^{OH(P)}$).
Figure 18:
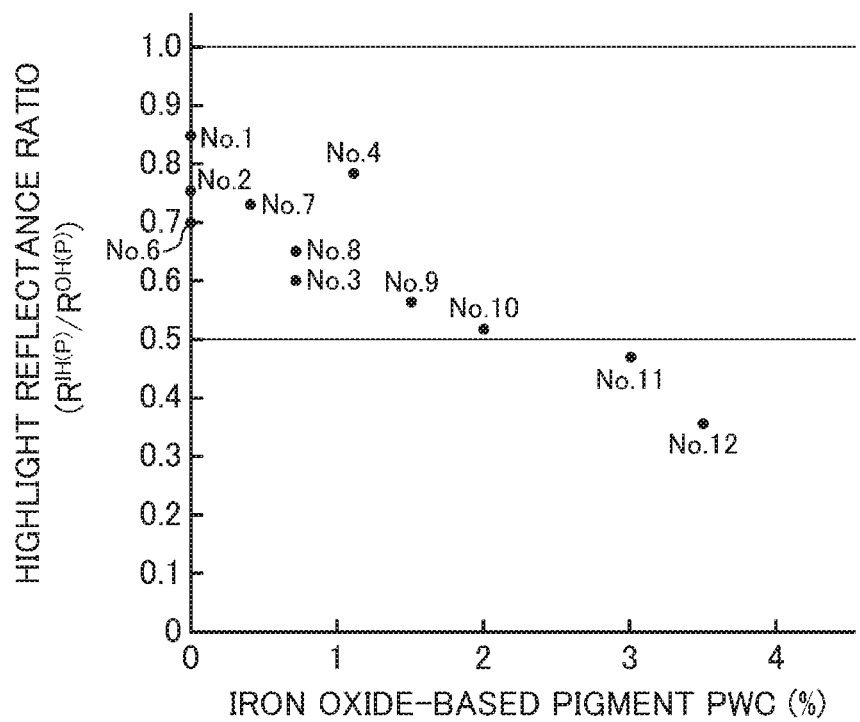
FIG. 18 is a graph illustrating the relationship between the content of the iron oxide-based pigment of the coating of each inner plate part and the highlight reflectance ratio ($R^{IH(P)}/R^{OH(P)}$).

FIGS. 16 and 17 show that, in order to ensure the coloring properties of red and enhance the coating strength, the mass ratio of the iron oxide-based pigment to the perylene-based pigment is preferably equal to or higher than 3% and equal to or lower than 20%. Moreover, FIGS. 16 and 17 show that, when the mass ratio of the iron oxide-based pigment to the perylene-based pigment is equal to or higher than 5% and equal to or lower than 15%, the highlight reflectance ratio ($R^{IH(P)}/R^{OH(P)}$) at the peak wavelength of the particular color can be maintained within a range of equal to or higher than 0.5 and equal to or lower than 1.0 (i.e., the coloring properties of red can be enhanced), as well as suppressing the amount of worn-out coating to equal to or less than 1.6 μm.

DESCRIPTION OF REFERENCE CHARACTERS

1 Outer Plate
2 Multilayer Coating
3 Electrodeposited Coating
4 Metallic Base Coating
5 Color-Clear Coating
6 Top Clear Coating
7 Glittering Material
8 Pigment
9 Intermediate Coating
11 Inner Plate Part
12 Coating

The invention claimed is:
1. A vehicle comprising:
an outer plate part of the vehicle;
an inner plate part of the vehicle;
a coating of the outer plate part of the vehicle; and
a coating of the inner plate part of the vehicle, wherein
the coating of the outer plate part contains a perylene-based pigment to produce a particular color, and
the coating of the outer plate satisfies $R^{OH(P)}/R^{OH(OA)} \geq 74$, where reflectance measured with reference to reflectance of a standard white plate at a light incidence angle of 45 degrees and a light reception angle of +30 degrees is defined as highlight reflectance, a wavelength at which reflectance reaches a maximum value in a spectral reflectance curve is defined as a peak wavelength, a wavelength range including a hue of a complementary color of the particular color and hues of colors positioned respectively on both sides of the complementary color of the particular color in a Munsell hue circle divided into ten hues is defined as a complementary wavelength range, $R^{OH(P)}$ is highlight reflectance of the coating of the outer plate at the peak wavelength, and $R^{OH(OA)}$ is average highlight reflectance of the coating of the outer plate in the complementary wavelength range,
the coating of the outer plate part is formed such that a metallic base coating, a color-clear coating and a transparent top clear coating are stacked on each other in this order, and
the metallic base coating contains aluminum flakes as a glittering material and a perylene-based pigment, and the color-clear coating contains a perylene-based pigment,
the coating of the inner plate part of the vehicle contains
a perylene-based pigment and an iron oxide-based pigment as pigments for producing a particular color similar to that of the coating of the outer plate, and
a content of the perylene-based pigment in the coating of the inner plate part is equal to or higher than 10% and equal to or lower than 14% in units of Pigment Weight Concentration, and
a mass ratio of a content of the iron oxide-based pigment to the content of the perylene-based pigment in the coating of the inner plate part is equal to or higher than 3% and equal to or lower than 20%.
2. The vehicle of claim 1, wherein
the coating of the inner plate part contains the pigments and a glittering material, and a ratio of the content of the perylene-based pigment to a total amount of the pigments and the glittering material in the coating of the inner plate part is equal to or higher than 50% by mass.
3. The vehicle of claim 1, wherein
the mass ratio of the content of the iron oxide-based pigment to the content of the perylene-based pigment in the coating of the inner plate part is equal to or higher than 5% and equal to or lower than 15%.
4. The vehicle of claim 1, wherein
an average particle size of the iron oxide-based pigment is equal to or greater than 50 nm and equal to or less than 60 nm.
5. The vehicle of claim 1, wherein
a highlight reflectance ratio $R^{IH(P)}/R^{OH(P)}$ of the inner plate part to the outer plate at the peak wavelength is equal to or higher than 0.5 and equal to or lower than 1.0, and an average highlight reflectance ratio $R^{IH(OA)}/R^{OH(OA)}$ of the inner plate part to the outer plate in the complementary wavelength range is equal to or higher than 1.0 and equal to or lower than 6.0, where $R^{IH(P)}$ is highlight reflectance of the coating of the inner plate part at the peak wavelength, and $R^{IH(OA)}$ is average highlight reflectance of the coating of the inner plate part in the complementary wavelength range.
6. The vehicle of claim 5, wherein
a face reflectance ratio $R^{IF(P)}/R^{OF(P)}$ of the inner plate part to the outer plate at the peak wavelength is equal to or higher than 0.7 and equal to or lower than 1.3, where reflectance measured with reference to the reflectance of the standard white plate at a light incidence angle of 45 degrees and a light reception angle of 0 degree is defined as face reflectance, $R^{OF(P)}$ is face reflectance of the coating of the outer plate at the peak wavelength, and $R^{IF(P)}$ is face reflectance of the coating of the inner plate part at the peak wavelength, and
a shade reflectance ratio $R^{IS(P)}/R^{OS(P)}$ of the inner plate part to the outer plate at the peak wavelength is equal to or higher than 1.0 and equal to or lower than 2.0, where reflectance measured with reference to the reflectance of the standard white plate at a light incidence angle of 45 degrees and a light reception angle of −30 degrees is defined as shade reflectance, $R^{OS(P)}$ is shade reflectance of the coating of the outer plate at the peak wavelength, and $R^{IS(P)}$ is shade reflectance of the coating of the inner plate part at the peak wavelength.

7. The vehicle claim 1, wherein
an amount of worn-out coating every 100 reciprocations is less than 1.8 μm when a sheet of abrasive paper having a mesh count of #1000 and having an area of 20×20 mm is used to perform an abrasion test of the coating of the inner plate part under conditions where a load is 200 g, a moving distance per reciprocation is 240 mm, the number of reciprocations per minute is 30, and the total number of reciprocations is 300.

* * * * *